United States Patent [19]

Marshall et al.

[11] 4,069,706
[45] Jan. 24, 1978

[54] COMPLEX VIBRATION TESTER

[75] Inventors: Philip Marshall, Lexington; Albert Paul Laber, Revere; Ugo Cauteruccio, West Roxbury, all of Mass.

[73] Assignee: MRAD Corporation, Woburn, Mass.

[21] Appl. No.: 742,872

[22] Filed: Nov. 18, 1976

[51] Int. Cl.² ............................ G01N 3/32; B06B 1/10
[52] U.S. Cl. ........................................................ 73/666
[58] Field of Search ................. 73/71.6, 71.5 R, 67.2; 198/766

[56] References Cited

U.S. PATENT DOCUMENTS 3,686,927  8/1972  Scharton ............................ 73/71.6

FOREIGN PATENT DOCUMENTS

890,748  3/1962  United Kingdom ................. 73/71.6

*Primary Examiner*—James J. Gill
*Attorney, Agent, or Firm*—Schiller & Pandiscio

[57] ABSTRACT

A mechanical complex vibration tester is provided which is capable of simultaneously applying a plurality of discrete frequencies to a workpiece positioned on a test surface of the device to simulate random vibration testing. The vibrations may be varied in amplitude and they may be applied in either the vertical or the horizontal direction. Means are provided for isolating the tester from its environment in order to simulate vibration testing in inertial space.

23 Claims, 12 Drawing Figures

COMPLEX VIBRATION TESTER

The present invention relates in general to new and improved vibration testing equipment, in particular to a complex mechanical vibration tester for concurrently inducing vibrations in a work piece at a plurality of discrete frequencies.

BACKGROUND OF THE INVENTION

Mechanical vibration testers of various kinds are in common use today for generating low frequency sinusoidal and steady-state vibrations. Such mechanical shakers, which are capable of operating in the approximate range of 0.1 to 100 Hz, vibrate at a single test frequency at all times. The test frequency may be held constant, or it may be varied to subject the work piece to vibrations throughout a range of different frequencies.

In the past, it has proven difficult and expensive to provide mechanical vibration test equipment which is capable of operating very much above the 100 Hz range, e.g. at frequencies ranging up to 3,000 Hz which are called for in certain tests.

From experience it has been found that single-frequency testing of work pieces, while satisfactory for certain purposes, simulates only a limited set of conditions. Under actual operating conditions random or complex vibration is induced in many instances. Such vibration results in far more stresses and strains in the equipment subjected thereto than are produced where only simple vibration is present. Accordingly, random or complex vibration testing of work pieces is necessary since it induces far more failures in inherently weak components or structures than show up in more conventional single-frequency sinusoidal tests. Conversely, work pieces that have been subjected to extensive periods of random or complex vibration testing and which have exhibited an acceptably low failure rate, or wherein the weak points have been exposed and corrected, have been shown to perform reliably under actual operating conditions. As used herein, the term complex vibration refers to an approximation of random vibration in a predetermined frequency spectrum using a limited number of discrete frequencies.

Past attempts to use mechanical vibrators to impart random or complex vibration to a work piece, i.e. to subject the work piece simultaneously to a number of discrete frequencies, have largely been unsuccessful. Thus, the vibration levels applicable to random or complex vibration testing are commonly specified in power spectral density units ($G^2$/Hz) as a function of frequency. See for example Military Standard MIL-STD-810C, entitled "Environmental Test Methods", dated Mar. 10, 1975. Note particularly Section 514.2, FIGS. 514.2-2A, 514.2-4, 514.2-4A and 514.2-5, among others. In the past, it has proven difficult to provide simple, inexpensive mechanical vibration test equipment in which vibration levels so specified could be readily furnished.

Presently available equipment for performing random or complex vibration testing generally takes the form of electrodynamic test apparatus. In such equipment the vibrations are electrodynamically imparted to one or more diaphragms, analogous to the manner in which vibrations are produced in a loudspeaker. In addition to being costly, equipment of this type is by necessity sophisticated and frequently requires extensive maintenance to keep it operating properly over long periods of time. Further, the complexity of the required maintenance and repair operations requires skills that are often beyond the scope of the user's personnel.

OBJECTS OF THE INVENTION

Accordingly, it is a primary object of the present invention to provide new and improved vibration test equipment which is not subject to the foregoing disadvantages.

It is another object of the present invention to provide a complex vibration tester which is more economical, simpler in construction and which requires less maintenance than heretofore available equipment for carrying out such tests.

It is a further object of the present invention to provide a mechanical vibration tester which is capable of imparting vibrations to a work piece simultaneously at a plurality of discrete frequencies.

It is still another object of the present invention to provide a mechanical vibration tester wherein complex vibration spanning a wide range of discrete frequencies may be induced in a work piece in either the horizontal or the vertical direction.

It is still a further object of the present invention to provide a mechanical complex vibration tester which is substantially isolated from its surrounding environment so as to simulate testing in inertial space.

SUMMARY OF THE INVENTION

In accordance with the present invention, a vibration tester which includes a plurality of resonator assemblies is provided, each assembly being mounted on a common structure and including an elongated beam. Means are provided for setting respective beams into concurrent vibrations at the resonant frequencies of their respective resonator assemblies. The resultant complex vibration is imparted to a test surface of the common structure on which a test sample may be positioned. The vibrations may be varied in amplitude and they may be applied in either the vertical or the horizontal direction. Means are also provided for isolating the tester from its environment in order to simulate vibration testing in inertial space.

These and other objects of the present invention, together with the features and advantages thereof, will become apparent from the following detailed specification when considered in conjunction with the accompanying drawings in which like reference numerals designate corresponding parts. Further, whenever reference numerals have the letters A or B appended thereto, it indicates the position of the designated part in one portion of an essentially symmetrical arrangement.

DESCRIPTION OF THE INVENTION

Figure 1:
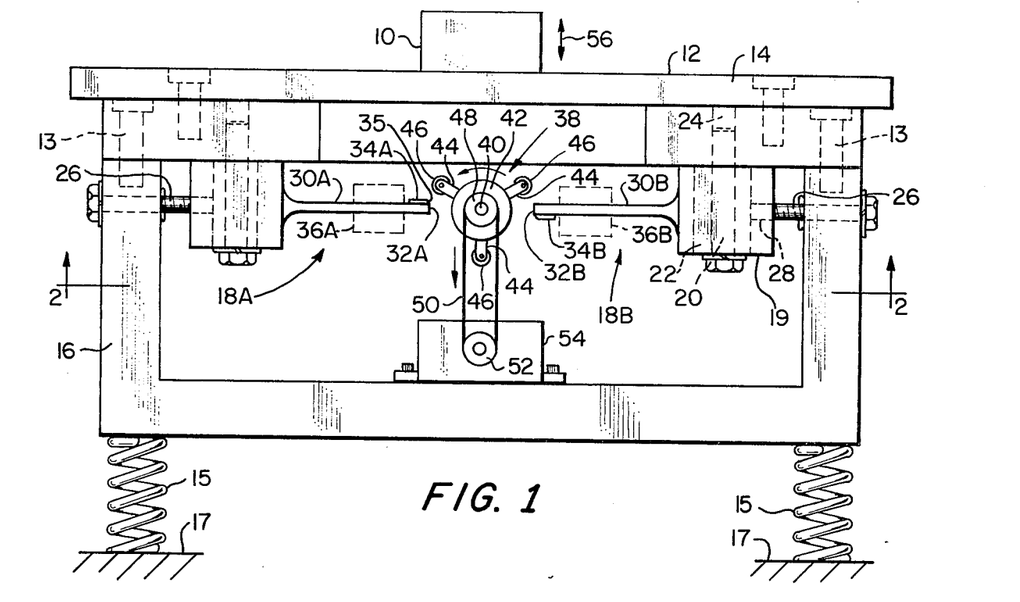
FIG. 1 is an elevation view of a preferred embodiment of the invention for imparting complex vibrations to a work piece in the vertical direction.
Figure 2:
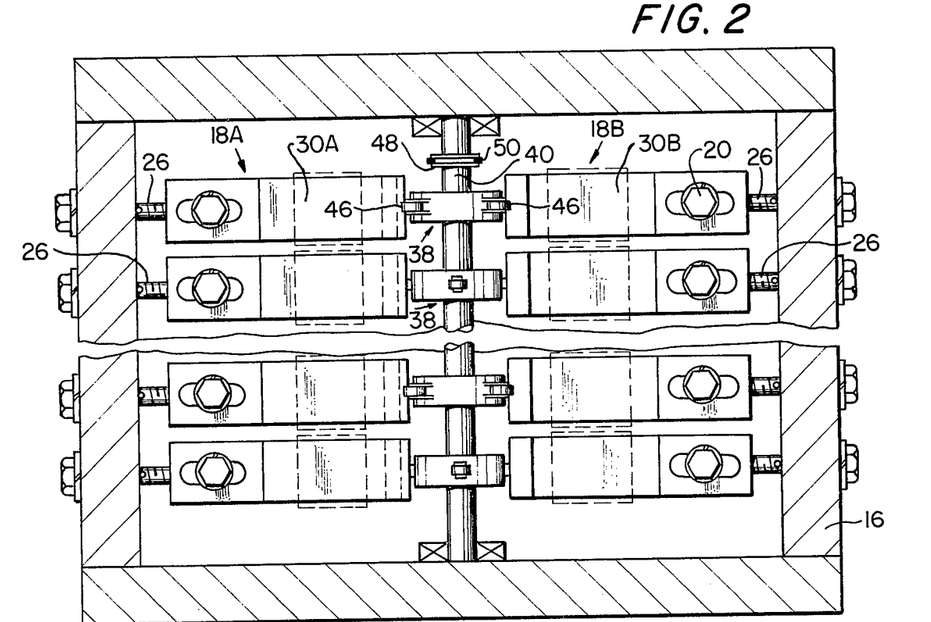
FIG. 2 is a cross-sectional view of the apparatus of FIG. 1 taken along line 2—2.

With reference now to the drawings, a preferred embodiment of the present invention for imparting vertical vibration to a work piece 10 as illustrated in FIGS. 1 and 2. The work piece is shown positioned on a test surface 12 of a work piece support platform 14. Platform 14 is mounted to the top of a frame 16 by means of bolts 13 to provide an integral, substantially rigid structure defining a hollow space within. Frame 16 is supported on a set of isolating springs 15 which rest on a substantially horizontal load bearing surface, e.g. a foundation or a reinforced floor 17.

Figures 3, 12:
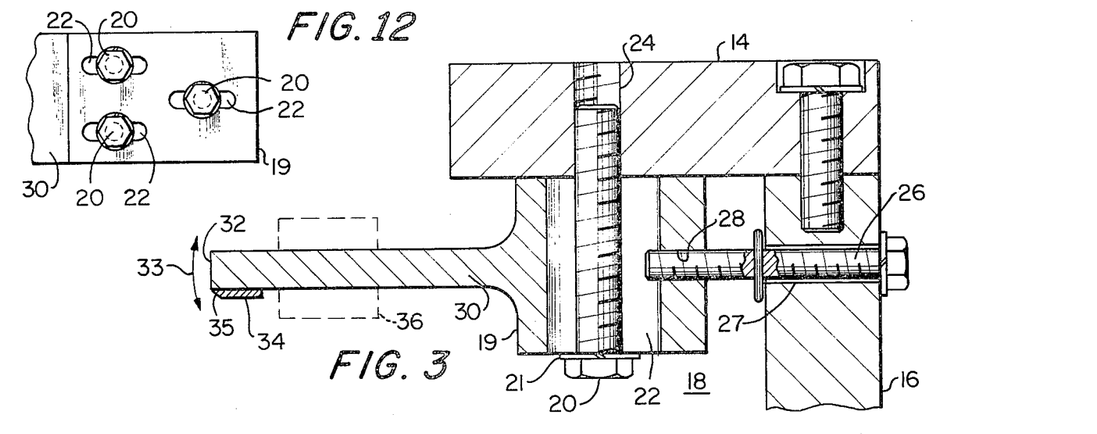
FIG. 3 illustrates in cross-section a preferred resonator assembly which may be employed in conjunction with the apparatus of FIG. 1.
FIG. 12 is a partial view of an alternative mounting arrangement for the resonator assembly of FIG. 3.
Figure 4:
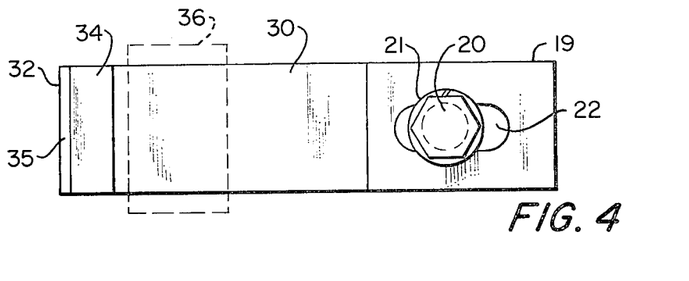
FIG. 4 partially illustrates in plan view the resonator assembly of FIG. 3.

The tester shown further includes successive pairs of resonator assemblies 18A and 18B, mounted in aligned position below platform 14 to form a pair of parallel rows which are similarly referred to by the reference numerals 18A and 18B. The details of a preferred embodiment of resonator assembly 18 are best shown in FIGS. 3 and 4. A flexible cantilever beam 30 extends outward from a mounting block 19 and terminates in a free end 32. A striker plate 34, which includes a beveled surface 35, is affixed to beam 30 with the beveled surface adjacent the free end. The striker plate may be attached to the top or to the bottom of the beam, depending on the position of the beam relative to other interacting parts of the invention, as explained hereinbelow. Beam 30 has a relatively high width-to-thickness ratio which enables it to be deflected from its rest position as shown in FIG. 3 and to vibrate freely about the latter as indicated by arrow 33.

Beam 30 further carries a mass 36, preferably adjacent free end 32, which is shown in dotted outline in the drawings since it may take a number of different forms. For example, each mass may consist of a pair of metal plates of selected size and weight which are jointly bolted to opposite sides of the beam 30. Alternatively, a yoke-shaped mass may be used, with the beam bolted between the two side pieces of the yoke.

A mounting block 19 terminates beam 30 opposite free end 32. The mounting block may be integral with beam 30, or it may be formed of a separate component bolted to the beam. A bolt 20 threads into a hole 24 in platform 14 to hold the resonator assembly against the latter. Bolt 20 further engages a bore 22 having an elongated cross-section, as best shown in FIG. 4. A washer 21 underlies the head of bolt 20. Resonator assembly 18 may be variably positioned relative to platform 14, the extent of such variation being determined by the length of the aforesaid cross-section of bore 22. A set screw 26 is disposed at right angles to bolt 20. The set screw passes through a bore 27 in frame 16 and threads into a hole 28 in mounting block 19. Thus, the action of set screw 26 may be used to cause resonator assembly 18 to advance to the left or to retract to the right in FIG. 3, depending on the desired position. After the positioning is completed, bolt 20 is tightened to fasten resonator assembly 18 firmly to platform 14. Although individually adjustable resonator assemblies are illustrated and described, the invention is not so limited. For example, each row of resonator assemblies may be mounted on a common support which is adjustably relative to platform 14 so as to provide for the simultaneous adjustment of all rows.

FIG. 12 illustrates another arrangement for fastening the resonator assembly, which may be preferable due to operational factors that are discussed hereinbelow. In place of a single bore and bolt arrangement, three bolts 20 are used with three corresponding bores 22. As before, each bolt extends through its bore and threads into a corresponding hole in the support platform. Each bore has an elongated cross-section such that the position of resonator assembly 18, and hence the position of beam 30, may be varied in the manner explained above.

As is best seen from FIGS. 1 and 2, the free-ends 32A and 32B of each opposed pair of cantilever beams 30A and 30B respectively, define a space therebetween. A set of striker assemblies 38 is mounted on a common rotatable shaft 40 so as to rotate therewith. Shaft 40 is positioned parallel to rows 18A and 18B. Thus, one striker assembly 38 is disposed between the pair of free ends 32A and 32B of each resonator assembly pair 18A and 18B.

Each striker assembly 38 includes a disk 42 affixed to shaft 40. A plurality of arms 44 is uniformly spaced around the periphery of disk 42, each arm radially extending from the disk periphery and carrying a rotatable cam roller 46 at its end. For purposes of illustration, disk 42 is shown with three arms and their corresponding cam rollers. It will be understood however, that the invention is not so limited and that any practical number of roller-carrying arms may be used.

As previously explained, when bolt 20 is loosened, the position of each resonator assembly may be varied relative to platform 14 by means of set screw 26. In the present invention the resonators are positioned to provide a predetermined amount of interference between free beam ends 32A and 32B in their rest position on the one hand and the path of rollers 46 on the other hand. The aforesaid path is determined as each striker assembly 38 rotates with shaft 40.

A pulley 48, which is driven by a belt 50, is mounted on shaft 40 for rotation therewith. Belt 50 further engages a drive pulley 52 which is powered from a motor 54 mounted on frame 16.

In operation, motor 54 drives belt 50 in the direction indicated by arrows in FIG. 1. This action causes pulley 48 and the attached shaft 40 to rotate in the counter-clockwise direction. By way of example and without limitation, the shaft may be rotated at a speed of 90 rpm. The resultant rotation of the shaft-mounted striker assemblies in the counter-clockwise direction causes each cam surface, i.e. the peripheral surface of each cam roller 46, to impact the beveled surface 35 of striker plate 34A during the downward movement of the cam roller. Depending on the selected amount of interference between free beam end 32A and roller 46, the free end is deflected downward a predetermined distance from its rest position. Similarly, during the upward movement of each cam roller 46, the cam surface impacts the beveled surface 35 of striker plate 34B to deflect free beam end 32B a predetermined distance in an upward direction.

At the predetermined deflection distance free beam end 32A is released. This action causes beam 30A to snap back and to vibrate freely about the rest position shown in FIG. 1. The frequency of beam vibration depends on the resonant frequency of resonator assembly 18A. The latter frequency is largely determined by the magnitude of mass 36A jointly with the other parameters of resonator assembly 18A, such as the geometry of the beam, the position of the mass along the beam length, etc. The amplitude of beam vibrations is primarily determined by the distance the beam is deflected before it is released. As outlined before, the aforesaid distance is a function of the extent to which cantilever beam 30A interferes with the path of rollers 46. Since the amount of this interference is adjustable by means of set screw 26, the amplitude of vibrations may be selected for any resonator assembly.

As explained above, beam 30A vibrates freely at the resonant frequency of resonator assembly 18A upon being released from its deflected position. The amplitude of such vibrations is maintained substantially constant due to the periodic forcing function applied by rollers 46. Thus, with the arrangement shown in FIG. 1, and assuming the rotation of shaft 40 to be 90 rpm for example, free beam end 32A is deflected 270 times per minute. Following each release, beam 30A is permitted to vibrate at the resonant frequency of resonator assembly 18A.

The operation outlined above for beam 30A is identical for beam 30B with the exception that free beam end 32B is deflected in the upward direction by rollers 46. Thus, in the assumed example the rollers will strike beam 30B 270 times per minute from below. Here again, each arriving roller 46 deflects free end 32B a distance determined by the pre-selected amount of interference therebetween. As before, the amplitude of vibration of beam 30B is a function of the amount of distance its free end 32B is deflected, while the frequency of vibration of resonator assembly 18B is determined by the magnitude of mass 36B and by the other parameters of the resonator assembly.

In practice, the mass affixed to each cantilever beam is chosen to be different for respective resonator assemblies to cause them to vibrate concurrently at different resonant frequencies. The amplitudes of the respective vibrations will in each case be adjusted in accordance with whether or not it is desired to enhance the vibrations of certain frequencies over others. In some instances it may be desirable to provide vibrations of such magnitude at a given frequency that it becomes necessary to tune more than one resonator assembly to that frequency in order that they may reinforce each other.

Since the resonator assemblies 18 are firmly fastened to work platform 14 by means of bolts 20, the vertical vibrations of cantilever beams 30 are transmitted to test surface 12 of the platform. The overall effect of providing vibrations at a plurality of discrete frequencies is to impart complex vibration to platform 14. It will be noted that such complex vibration is obtained using only mechanical equipment which requires a minimum of maintenance once it is tuned to the desired frequencies. Further, far higher frequencies are available with equipment of the type discussed than are obtainable with prior art mechanical vibrators.

As previously explained, frame 16 is supported on the floor or other substantially horizontal load bearing surface 17 by means of springs 15 which may, for example, be disposed to support each corner of the frame. A soft spring suspension is used, i.e. one whose natural frequency in the direction of beam vibration is significantly lower than the lowest resonant frequency of any of the resonator assemblies 18 that are employed. In a preferred embodiment, the natural frequency of springs 15 in the vertical direction is no greater than one half of the lowest resonant frequency. As a consequence, frame 16 is effectively isolated from vibrations it could otherwise receive through its surrounding environment, i.e. through load bearing surface 17. Hence, the vibration testing of work piece 10, which is positioned on test surface 12, essentially simulates testing under inertial space conditions. Work piece 10 is thus subjected substantially only to vertical vibrations imparted to it at the discrete resonant frequencies of the respective resonator assemblies.

Depending on the parameters of each resonator assembly and on the magnitude of the selected mass 36, discrete frequencies ranging between approximately 5 Hz and 3,000 Hz may be obtained with the present invention. As best seen from FIG. 3, the vibrations of each cantilever beam 30 in the direction of arrow 33 put respective portions of bolt 20 alternately under tension and compression. It is conceivable that such action may tend to loosen bolt 20, particularly at the higher frequencies, to a point where the resonator assembly and the work table to which it is affixed no longer vibrate in unison.

Similarly, in the case of misalignment between a striker assembly and the corresponding cantilever beam, it is possible for rollers 46 to strike the free end 32 of that beam slightly off center. This may also occur when the rollers strike the beam at an angle. In either case, such action tends to set up a twisting moment about the longitudinal beam axis. Here again, the ultimate stresses and strains produced by the off-center impact may serve to loosen bolt 20.

The arrangement for mounting the resonator assembly illustrated in FIG. 12 overcomes the foregoing problems. As shown, block 19 is fastened to work table 14 by means of three bolts 20. The three-point support so formed provides materially greater security against loosening due to the balance of forces it provides during vibrations. Thus, at least one bolt will always be in tension when one or both of the other bolts are in compression as a result of the vibrations of cantilever beam 30. Further, if the free end of the beam is struck off center or at an angle, the resultant twisting moment will be balanced by the presence of the three-point support.

Figure 5:
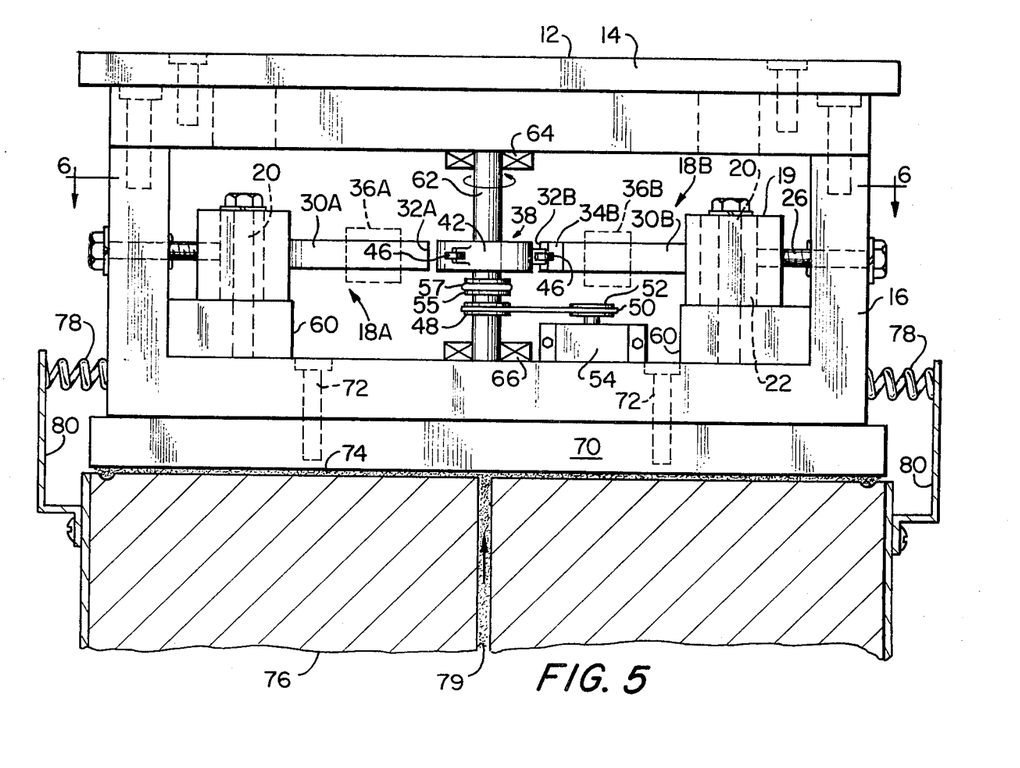
FIG. 5 is an elevation view of another embodiment of the present invention for imparting complex vibration in a horizontal direction.
Figure 6:
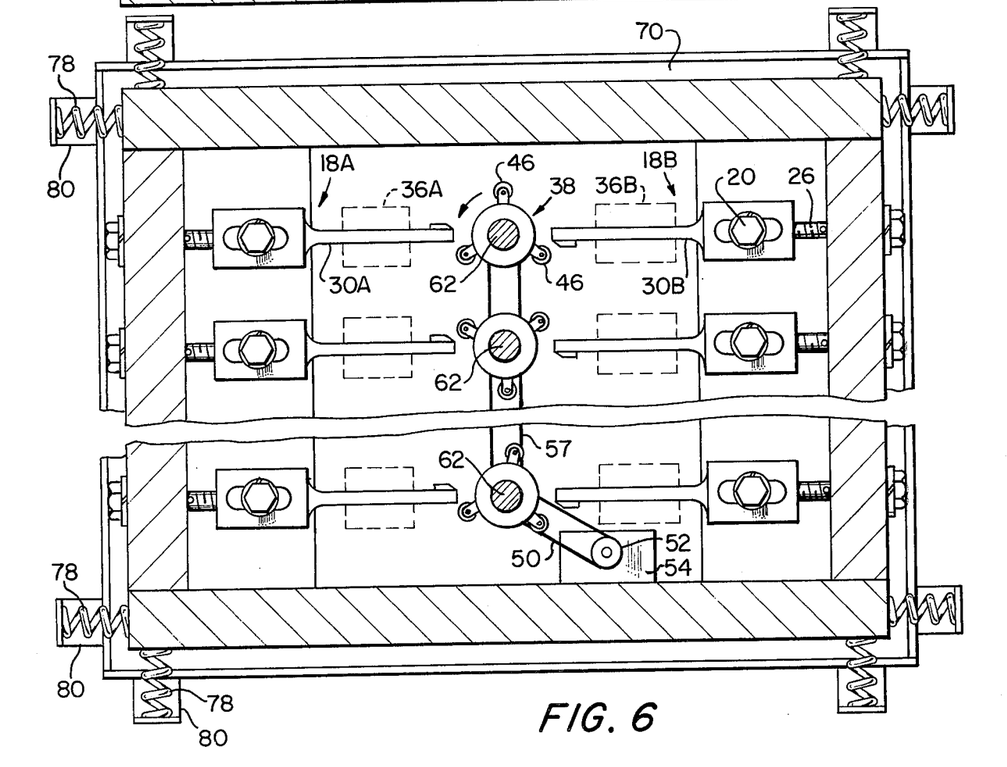
FIG. 6 is a cross-sectional view of the apparatus of FIG. 5 taken along line 6—6.

FIGS. 5 and 6 illustrate another embodiment of the present invention which provides horizontal vibrations at a plurality of discrete frequencies. In this arrangement resonator assemblies 18A and 18B are affixed to frame 16 by means of bolts 20, either directly or by means of supporting blocks 60 which are themselves fastened to the frame as shown. Resonator assemblies 18A and 18B are substantially identical to like-numbered parts in FIGS. 1 and 2 and need not be further described here. Cantilever beams 30A and 30B are positioned to vibrate in the horizontal direction, i.e. into and out of the plane of the paper in FIG. 5. The resonator assemblies are arranged in successive pairs, aligned to form a pair of parallel rows which are similarly referred to by the reference numerals 18A and 18B.

The free beam ends 32A and 32B of each pair of resonator assemblies face each other and define a space between them. A vertical shaft 62, which is rotatably disposed in a set of bearings 64 and 66 fastened to platform 14 and to frame 16 respectively, is disposed in the space between each pair of facing free beam ends 32A and 32B. A striker assembly 38 is mounted on each shaft 62 for rotation therewith to cause rollers 46 to deflect beam ends 32A and 32B, substantially as explained in connection with the embodiment shown in FIGS. 1 and 2. As in the latter embodiment, the interference between cam wheels 46 and free beam ends 32A and 32B respectively, is regulated by appropriate set screws 26 which are adapted to adjust the position of block 19 to the extent permitted by the cross-sectional length of bore 22.

Motor 54 is adapted to rotate drive pulley 52. Such rotation is transmitted by belt 50 to pulley 48, which is positioned on the first one of the sequence of shafts 62 shown in FIG. 6. Thus, belt 50 serves to rotate the aforesaid first shaft 62, together with pulley 55 which is also mounted thereon. A belt 57 couples pulley 55 to a corresponding pulley on the second shaft 62. Likewise, each subsequent shaft 62 is belt-coupled to the one preceding it so that rotary power is transmitted to each shaft 62 of the entire sequence. It will be obvious that other arrangements are possible for transmitting the rotary power of motor 54 to shafts 62.

Frame 16 is bolted to a plate 70 by means of bolts 72. Plate 70 rides on an oil film 74 which covers the top surface of a massive slip table 76. The latter may, for example, be formed of granite which is capable of absorbing vibrations. Oil film 74 may be supplied under pressure through a passage 79 positioned centrally on the granite table. The presence of the oil film permits plate 70, together with frame 16 and platform 14, to glide freely in the horizontal plane of the film. Such horizontal motion is constrained only by a set of springs 78. The latter are disposed between frame 16 and a corresponding set of brackets 80, each of which is fastened to table 76. In a preferred embodiment a pair of springs, spaced from each other, bear against each side of the table.

In operation, the massive granite table absorbs the majority of vertical vibrations received from the load bearing surface on which it stands. To the extent that such vertical vibrations are transmitted to test surface 12, they have relatively little effect on a horizontal vibration test. Frame 16 is also isolated from the horizontal vibrations of the load surface by the presence of springs 78. The latter are selected to have a natural frequency substantially less than the lowest resonant frequency of any resonator assembly positioned on frame 16. In a preferred embodiment of the invention, springs 78 have a natural frequency no greater than one half of the lowest resonant frequency of any resonator assembly employed in the horizontal vibration tester illustrated in FIGS. 5 and 6.

Figure 7:
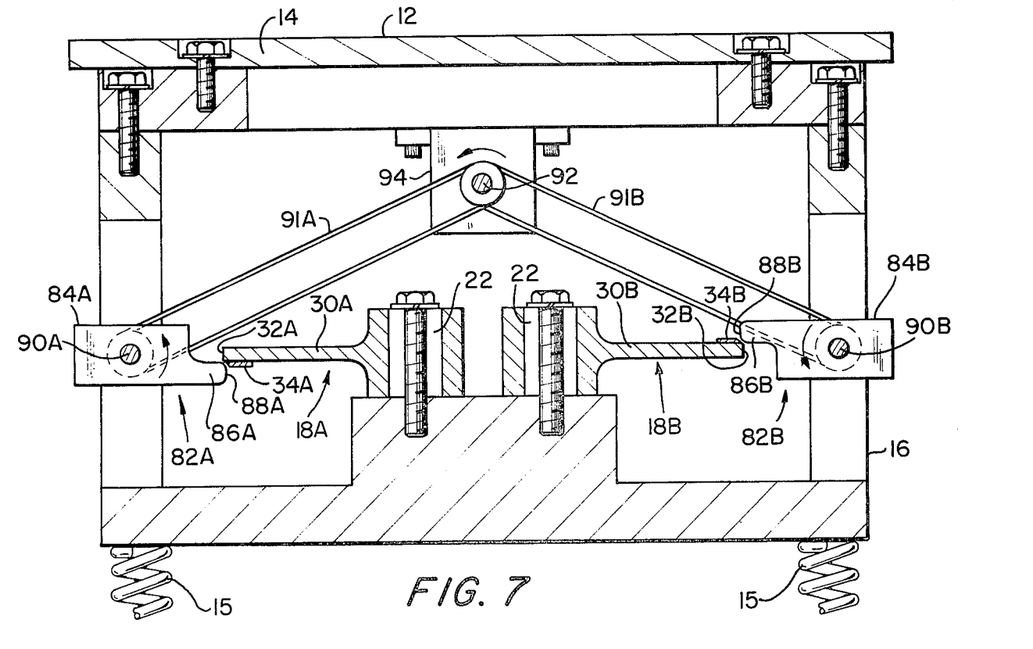
FIG. 7 illustrates another embodiment of the present invention in cross-sectional view.

FIG. 7 illustrates still another embodiment of the present invention wherein pairs of resonator assemblies 18A and 18B are mounted in a pair of parallel rows positioned centrally of the interior space defined by frame 16 and platform 14. In this arrangement the striker assemblies are positioned in a pair of parallel rows which bracket the rows of resonator assemblies. Striker assembly 82A comprises a rotatable striker block 84 having a finger 86A and a cam surface 88A which contact the beveled surface of striker plate 34A from below. Due to the interference between cam surface 88A and free-beam end 32A, the latter is deflected upward by a predetermined amount. A similar action takes place between the free beam end 32B of resonator 18B and the cam surface 88B of striker assembly 82B, except that free beam end 32B is deflected downward. It will be understood that striker assemblies 82A and 82B may each have more than one finger 86, depending only on the frequency at which the forcing function of the cantilever beams is to be performed. Further, other striker assemblies, e.g. as shown in FIG. 1, may be substituted for those shown in FIG. 7.

Striker assemblies 82A and 82B are mounted on rotatable shafts 90A and 90B respectively, which are driven by belts 91A and 91B coupled to a power shaft 92 by means of appropriate pulleys. Power shaft 92 is adapted to be rotated by a motor 94.

The vibration tester illustrated in FIG. 7 is positioned on a set of soft springs 15. As in the embodiment of FIG. 1, the springs have a natural frequency substantially less than the lowest resonant frequency of any resonator assembly employed in the apparatus of FIG. 7. In a preferred embodiment the natural frequency of the springs is less than one half of the lowest one of the aforesaid resonant frequencies.

Resonator assemblies 18A and 18B are illustrated as having bores 22 of elongated cross section in the embodiment of FIG. 7, that permit positional adjustments as discussed above. However, such adjustments may be difficult to make since the position of the resonator assemblies in the center of the enclosure defined by frame 16 and platform 14 inhibits accessibility. Accordingly, in such an arrangement it is preferable to vary the extent of interference between fingers 86 and the free beam ends by adjusting the position of striker assemblies 82A and 82B rather than that of the resonator assemblies.

Figure 10:
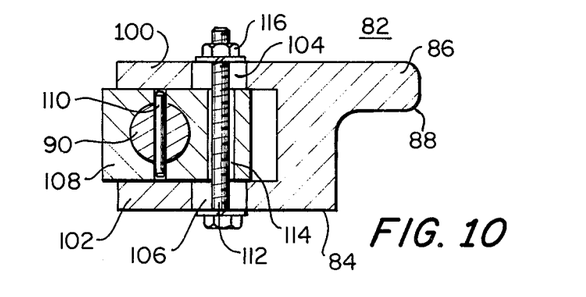
FIG. 10 illustrates in cross-sectional view still another embodiment of a striker assembly.
Figure 11:
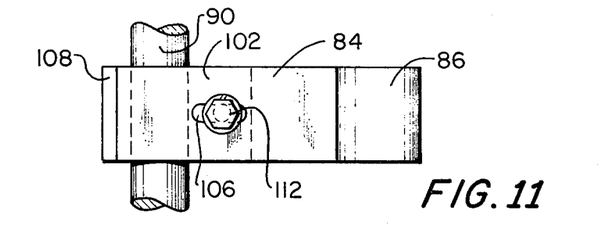
FIG. 11 is a plan view of the apparatus of FIG. 10.

FIGS. 10 and 11 illustrate an arrangement for implementing a positional adjustment of striker assembly 82. As shown, striker block 84 terminates in a yoke having arms 100 and 102. The yoke arms include elongated slots 104 and 106 aligned with each other. Shaft 90 is fastened to shaft block 108 by means of a pin 110, such that the shaft block will rotate with shaft 90. A bolt 112 extends through aligned slots 104 and 106 in the yoke arms, as well as through a bore 114 in shaft block 108. A nut 116 threads onto the end of bolt 112 so as to fasten striker assembly 82 onto shaft block 108. When nut 116 is loosened, striker assembly 82 may be moved to the left or to the right in FIG. 10, as permitted by the length of elongated slots 104 and 106, to adjust the interference between finger 86 and the corresponding free beam end.

Figure 8:
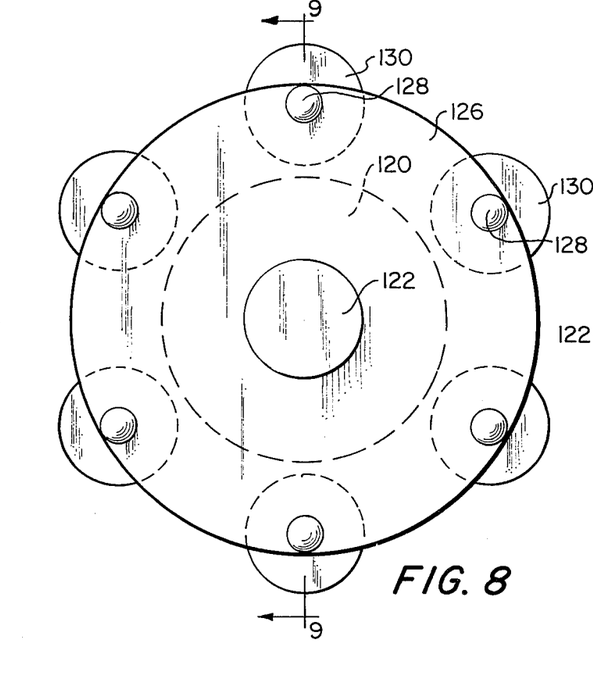
FIG. 8 illustrates an alternative embodiment of a striker assembly that may be used in conjunction with the present invention.
Figure 9:
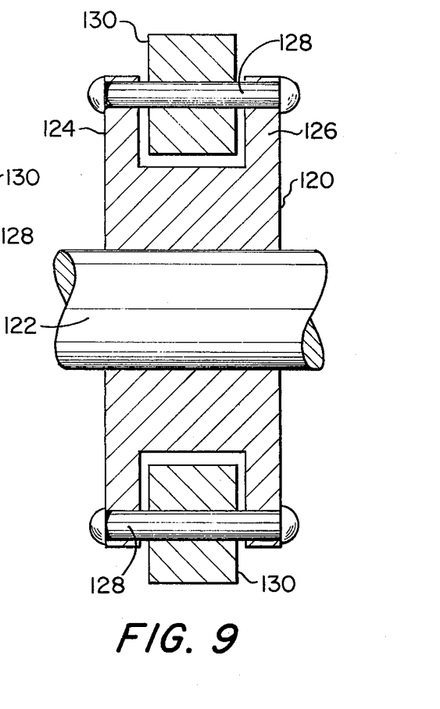
FIG. 9 is a cross-sectional view of the apparatus of FIG. 8 taken along line 9—9.

FIGS. 8 and 9 illustrate another embodiment of a striker assembly which may be employed in place of those shown elsewhere in the drawings and discussed hereinabove. A disk 120 is affixed to a rotatable shaft 122 so as to rotate therewith. The disk periphery comprises a pair of flanges 124 and 126 which define a space between them having a U-shaped cross-section. A plurality of shafts 128 is uniformly spaced around the disk periphery, each shaft being fastened to flanges 124 and 126. A cam roller 130 is rotatably disposed on each shaft, each roller being partially accommodated within the aforesaid U-shaped space and extending beyond the periphery of disk 120. The cam surface, i.e. the peripheral surface of each cam roller 130, is adapted to make contact with an interfering free beam end. It will be clear that the embodiment illustrated in FIGS. 8 and 9 is not limited to the number of cam rollers shown, but that any number of rollers may be employed, depending only on the desired frequency with which it is desired to strike the free end of the corresponding cantilever beam.

From the foregoing discussion it will be apparent that the invention is not limited to the various embodiments shown and described, but that substitutions, changes and modifications, including the interchange of equivalent components between the various vibration testers described and illustrated, may be made without departing from the scope of the present invention.

Thus, as pointed out above, the various striker assemblies shown and described, while themselves capable of modification, may be readily interchanged between the various embodiments of the invention. Similarly, the resonator assemblies may be modified. For example, to lessen the manufacturing costs cantilever spring 30 and block 19 may be made as separate items and bolted together.

The manner in which mass 36 is affixed to cantilever beam 30 may vary with particular manufacturing requirements, expedience, costs and with the form which the mass itself takes. It will be clear that the shape of the mass, its position on the cantilever beam and the geometry of the latter all affect the operation of the resonator assembly and they may be varied to obtain the desired operating characteristics.

It is also possible to mount the resonator assemblies on a common base which may be adjustable with respect to the frame. In this manner the interference between the free beam ends of the commonly mounted resonator assemblies and the corresponding cam surfaces may be jointly adjusted to speed up the set-up time of the vibration tester.

While the resonator position adjustment has been shown in conjunction with a set screw, different arrangements are possible. For example, in lieu of a set of screw a simple guide pin may be used. The resonator assembly can be slid along the pin to be positioned and clamped in place at the desired point. In such an arrangement, however, a pair of guides is preferably used in order to avoid skewing of the resonator assembly during the positioning operation.

It will be understood that the beveled striker plate affixed to each cantilever beam is there only for the protection of the beam. However, the plate must be taken into consideration with respect to the operating characteristics of the resonator assembly. If the striker assembly is rotated at a rate low enough to produce only gentle impact between the cam surface and the cantilever beam, the striker plate may be dispensed with.

Different ways of transmitting rotary motion to the respective shafts may be used in accordance with expedience and cost. In a preferred embodiment timing belts and pulleys are employed, but it will be understood that other arrangements, such as gearing, may be used.

Although coil springs have been illustrated and described, the invention is not so limited. Thus, various types of spring isolating arrangements may be used, provided only that the natural frequency of such springs is substantially less than the lowest resonant frequency of the resonator assemblies employed.

In FIG. 5 the horizontal vibration tester is shown bolted to plate 70. The latter is positioned on an oil film disposed on a substantially horizontal surface of a slip table. In an alternative embodiment of the invention plate 70 is dispensed with and the bottom surface of frame 16 is placed directly in contact with the oil film.

As shown in the drawings, e.g. in FIGS. 2 and 6, respective striker assemblies need not be in phase with each other, i.e. the corresponding cantilever beams may be struck out of phase. Moreover, means may be provided to vary such phasing, e.g. by adjusting the position of each striker assembly on its drive shaft. Under certain conditions it may also be desirable to vary the rate at which individual striker assemblies strike the corresponding cantilever beam. For example, in the embodiment of the invention illustrated in FIG. 6, the latter variation may be obtained by suitably varying the pulley or gear ratio by which individual shafts 62 are driven.

While an elongated, linear cantilever beam has been illustrated and described, the invention is not so limited. Thus, in order to save space it may be advantageous to use an elongated curved cantilever beam, e.g. one that is horseshoe-shaped. As in the case of the linear beam, vibration will occur in the plane of the beam, with the striker assembly suitably positioned to accomplish such vibration.

Similarly, other beam shapes and types of beams may be employed. For example, each beam may be configured as a tuning fork. Further, a simply supported beam may be used, i.e. a beam fixed at both ends thereof which is struck in the middle to set it into vibration. Accordingly, the term cantilever beam, as used herein, is intended to cover all beams having any of the configurations described hereinabove.

With the present invention vibrations in a common direction may be generated at discrete frequencies ranging approximately from 5 Hz to 3,000 Hz, so as to impart complex vibration in the same direction to any work piece positioned on the vibrated test surface. The presence of the isolating springs assures that such vibration testing is carried out in an environment that simulates inertial space, free from outside interference. By using only mechanical components (with the exception of the drive motor), a complex vibration tester is provided at a cost far less than is feasible with prior art electrodynamic testers. Moreover, once tuned, the vibration tester in accordance with the present invention requires little, if any, continuing maintenance.

From the foregoing discussion it will be apparent that numerous modifications, departures and changes will now occur to those skilled in the art, all of which fall within the spirit and scope of the invention as defined by the appended claims.

What is claimed is:

1. Apparatus for vibration testing a work piece adapted to be positioned on a test surface comprising:
   a substantially rigid support structure including said test surface;
   means for generating vibrations including at least one resonator assembly mounted on said structure, said resonator assembly comprising an elongated cantilever beam including a fixed end and a free end respectively; and
   means mounted on said structure for setting said cantilever beam into free vibration to cause said resonator assembly to vibrate substantially at its own resonant frequency;

whereby the vibrations of said resonator assembly are adapted to be imparted to said test surface through said support structure.

2. The apparatus of claim 1 wherein said vibration generating means includes a plurality of said resonator assemblies each adapted to vibrate at its own discrete resonant frequency;

said vibration setting means being adapted to induce free concurrent vibrations of said cantilever beams at the discrete resonant frequencies of their respective resonator assemblies;

whereby complex vibration is imparted to said test surface having substantially said discrete resonant frequencies as its constituent components.

3. The apparatus of claim 2 wherein each of said elongated cantilever beams has a mass of predetermined magnitude affixed thereto inwardly of said free beam end;

said mass being effective to determine the resonant frequency of said beam vibrations in conjunction with the other parameters of the corresponding resonator assembly.

4. Apparatus for vibration testing a work piece adapted to be positioned on a test surface comprising:

a substantially rigid support structure including said test surface;

means for generating vibrations including a plurality of resonator assemblies mounted to said structure each adapted to vibrate at its own discrete frequency, each of said resonator assemblies comprising an elongated cantilever beam including a fixed end and a free end respectively;

a mass of predetermined magnitude affixed to each of said beams inwardly of its free beam end, said mass being effective to determine the resonant frequency of beam vibrations in conjunction with the other parameters of the corresponding resonator assembly; and means for setting said cantilever beams into vibration to cause said resonator assemblies to vibrate concurrently at their discrete resonant freqencies, said vibration setting means comprising means corresponding to each of said cantilever beams for mechanically deflecting the free beam end thereof from its normal rest position, said last-recited means being further adapted to release said deflected free beam end a predetermined distance from said rest position to permit said beam to vibrate freely about said rest position;

whereby complex vibration is imparted to said test surface through said support structure, said complex vibration having substantially said discrete resonant frequencies as its constituent components.

5. The apparatus of claim 4 and further including means for selectively adjusting said predetermined distance to vary the amplitude of said vibrations about said rest position.

6. The apparatus of claim 4 wherein said mechanical deflecting means is adapted to produce beam vibrations about said rest position substantially in the same predetermined direction for each of said resonator assemblies; and means of isolating said structure from vibrations in said predetermined direction arising in the environment external to said structure, said isolating means including spring means interposed between said structure and said external environment;

said spring means having a natural frequency of vibration in said predetermined direction no greater than one-half the lowest one of said discrete resonant frequencies.

7. The apparatus of claim 6 wherein said deflecting means is adapted to produce beam vibrations substantially in the vertical direction;

said spring means supporting said structure on a substantially horizontal load bearing surface and being adapted to filter out vertical vibrations of the latter surface.

8. The apparatus of claim 6 wherein said deflecting means is adapted to produce beam vibrations substantially in a predetermined horizontal direction; and further including a substantially horizontal load bearing surface;

a lubricating film disposed on said load bearing surface;

said structure being positioned on said lubricating film to provide it with freedom of motion in the plane of said load bearing surface; and a plurality of brackets fixedly referenced to said load bearing surface and extending above the latter opposite said structure;

said spring means being disposed between said brackets and said structure in a manner adapted to filter out vibrations of said load bearing surface at least in said predetermined horizontal direction.

9. The apparatus of claim 4 wherein each of said deflecting means comprises a rotatable striker assembly including at least one cam surface;

means for positioning each resonator assembly and its corresponding striker assembly relative to each other such that the free beam end of said resonator assembly extends into the path of the corresponding cam surface by a predetermined amount; and means for rotating said striker assembly to cause said cam surface to periodically deflect and subsequently release said free beam end.

10. The apparatus of claim 9 wherein each of said cantilever beams further includes a striker plate having a beveled surface, said striker plate being positioned on said cantilever beam so as to receive the impact of said cam surface substantially on said beveled surface.

11. The apparatus of claim 9 wherein each of said resonator assemblies further includes a mounting block terminating said cantilever beam at said fixed beam end, said mounting block including means for adjustably fastening said resonator assembly to said structure to selectively vary the extent of interference between said free end and said cam surface;

whereby the amplitude of said beam vibrations is adjustable as a function of said selectively variable interference.

12. The apparatus of claim 11 and further including at least one bore in said mounting block having an elongated cross-section;

a bolt engaging said bore and threading into said structure to hold said resonator assembly thereagainst, the position of said resonator assembly relative to said structure being adjustable to permit said interference to be varied an amount substantially determined by the length of said elongated cross-section; and a set screw engaging a bore in said structure at right angles to said bolt, said set screw threading into said mounting block to permit a fine adjustment of the extent of said interference.

13. The apparatus of claim 9 and further including means for adjustably mounting each of said striker assemblies, said last-recited mounting means being adapted to selectively vary the extent of interference between said cam surface and said free beam end of the corresponding resonator assembly;

whereby the amplitude of said beam vibrations is adjustable as a function of said selectively variable interference.

14. The apparatus of claim 13 wherein each of said striker assemblies is mounted on a rotatable shaft so as to rotate therewith, each striker assembly further comprising:

a shaft block fastened to said shaft and including a bore;

a yoke bracketing said shaft block between the arms thereof;

each of said yoke arms including an elongated slot; and a bolt engaging said slots and said bore, said bolt being adapted to fasten said yoke to said shaft block;

the length of said elongated slots permitting a positional adjustment of said yoke radially of said shaft to vary the extent of said interference.

15. The apparatus of claim 9 wherein each of said striker assemblies is mounted on a rotatable shaft so as to rotate therewith, each striker assembly further comprising:

a disk coaxial with said shaft;

a plurality of rotatable cam rollers each including a peripheral cam surface, said rollers being uniformly mounted around the periphery of said disk so as to protrude beyond said disk periphery radially of said shaft; and means for rotating said shaft;

whereby the free beam end of the corresponding resonator assembly is deflected by the cam surface of each of said plurality of rollers during each revolution of said shaft.

16. The apparatus of claim 15 and further including a plurality of arms uniformly spaced around said disk periphery and extending radially outward therefrom, each of said arms carrying one of said rotatable rollers at its end.

17. The apparatus of claim 15 wherein said disk periphery includes a pair of parallel flanges extending continuously around said disk and defining a space therebetween;

a plurality of roller shafts uniformly spaced around said disk periphery normal to said flanges and bridging said space therebetween;

each of said roller shafts having one of said cam rollers rotatably disposed thereon, each of said rollers protruding partially beyond said space between said flanges in a direction radially outward from said disk periphery.

18. The apparatus of claim 9 wherein said resonator assemblies are mounted in successive pairs on said structure aligned to form two parallel rows;

the free beam ends of each of said pairs of resonator assemblies mutually facing each other and defining a space therebetween;

a rotatable shaft positioned between said rows and parallel thereto;

each of said striker assemblies being affixed to said shaft in a separate one of said spaces and being adapted to deflect said facing free beam ends in mutually opposite directions substantially normal to said shaft; and means for rotating said shaft.

19. The apparatus of claim 9 wherein said resonator assemblies are mounted in successive pairs on said structure aligned to form two parallel rows;

the free beam ends of each of said pairs of resonator assemblies mutually facing each other and defining a space therebetween;

a separate rotatable shaft positioned between each of said resonator assembly pairs normal to the plane defined by said parallel rows;

each of said shafts having one of said striker assemblies affixed thereto in said space, said striker assembly being adapted to deflect said facing free beam ends in mutually opposite directions substantially parallel to said rows; and means for rotating each of said shafts.

20. Mechanical vibration apparatus comprising:

a frame;

a work piece support platform mounted to the top of said frame and including a horizontal test surface adapted to hold a work piece under test;

said frame and said platform jointly forming a substantially rigid, integral structure defining an enclosed interior space;

a plurality of resonator assemblies mounted on said structure in said interior space;

each of said resonator assemblies including an elongated flexible cantilever beam having a free end adapted to be vertically deflected from a rest position, said beam terminating in a mounting block opposite its free end;

each of said resonator assemblies further including a mass affixed to said cantilever beam inwardly of said free end, the resonant frequency of free beam vibrations about said rest position being determined by said mass in conjunction with the other parameters of said resonator assembly, the magnitude of each mass being selected to provide a discrete resonant frequency of vibration for each of said resonator assemblies;

said plurality of resonator assemblies being arranged in successive pairs aligned to form two parallel rows, the free beam ends of each of said pairs of resonator assemblies being spaced from each other in mutually facing relationship;

a rotatable shaft positioned between said rows and parallel thereto;

means for rotating said shaft;

a plurality of striker assemblies mounted on said shaft and adapted to rotate therewith, each of said striker assemblies including a plurality of rollers uniformly disposed around said shaft and radially spaced therefrom, said rollers being in alignment with a pair of said mutually facing free beam ends in a vertical plane normal to said shaft;

said rollers of each rotating striker assembly being adapted to periodically deflect said pair of mutually facing free beam ends a selected distance in opposite substantially vertical directions prior to their release to produce free beam vibrations in said vertical plane, said selected deflection distance being determinative of the amplitude of said free beam vibrations; and a plurality of springs supporting said frame on a substantially horizontal load surface, the natural frequency of said springs being no greater than one half of the lowest one of said discrete resonant frequencies;

whereby the vibrations of each of said cantilever beams are transmitted through said structure to impart complex vibration in a vertical direction to said test surface, the constituent components of said complex vibration consisting substantially of said discrete frequencies of vibration.

21. Mechanical vibration apparatus comprising:
a frame;
a work piece support platform mounted to the top of said frame and including a horizontal test surface adapted to hold a work piece under test;
said frame and said platform jointly forming a substantially rigid, integral structure defining an enclosed interior space;
a plurality of resonator assemblies including an elongated flexible cantilever beam having a free end adapted to be vertically deflected from a rest position, said beam terminating in a mounting block opposite its free end;
each of said resonator assemblies further including a mass affixed to said cantilever beam inwardly of said free end, the resonant frequency of free beam vibrations about said rest position being determined by said mass in conjunction with the other parameters of said reonator assembly, the magnitude of each mass being selected to provide a discrete resonant frequency of vibration for each of said resonator assemblies;
said plurality of resonator assemblies being positioned with said free beam ends facing outward from the center of said interior space and being aligned in two parallel rows;
a pair of rotatable shafts each positioned outwardly of one of said rows and parallel thereto;
a drive shaft coupled to said pair of shafts;
means for rotating said drive shaft;
a plurality of striker assemblies mounted on each one of said pair of shafts and being adapted to rotate therewith, each of said striker assemblies including at least one cam surface radially spaced from its corresponding shaft and in alignment with one of said free beam ends in a vertical plane;
said cam surface being adapted to periodically deflect said aligned free beam end a selected distance in a substantially vertical direction prior to its release to produce free beam vibrations in said vertical plane, said selected distance being determinative of the amplitude of said free beam vibrations; and
a plurality of springs supporting said frame on a substantially horizontal load surface, the natural frequency of said springs being no greater than one half of the lowest one of said discrete resonant frequencies;
whereby the vibrations of each of said cantilever beams are transmitted through said structure to impart complex vibration in a vertical direction to said test surface, the constituent components of said complex vibration consisting substantially of said discrete frequencies of vibration.

22. Mechanical vibration apparatus comprising:
a frame;
a workpiece support platform mounted to the top of said frame and including a horizontal test surface adapted to hold a work piece under test;
said frame and said platform jointly forming a substantially rigid, integral structure defining an enclosed interior space;
a plurality of resonator assemblies mounted on said structure in said interior space;
each of said resonator assemblies including a flexible cantilever beam having a free end adapted to be horizontally deflected from a rest position, said beam terminating in a mounting block opposite its free end;
each of said resonator assemblies further including a mass affixed to said cantilever beam inwardly of said free end, the resonant frequency of free beam vibrations about said rest position being determined by said mass in conjunction with the other parameters of said resonator assembly, the magnitude of each mass being selected to provide a discrete resonant frequency of vibration for each of said resonator assemblies;
said plurality of resonator assemblies being arranged in successive pairs aligned to form two parallel rows, the free beam ends of each of said pairs of resonator assemblies being spaced from each other in mutually facing relationship;
a plurality of rotatable vertical shafts each positioned between one of said pairs of resonator assemblies;
means for rotating said shafts;
a striker assembly mounted on each of said vertical shafts and adapted to rotate therewith, each of said striker assemblies including a plurality of rollers uniformly disposed around its corresponding shaft and radially spaced therefrom, said rollers being in alignment with a pair of said mutually facing free beam ends in a horizontal plane;
said rollers of each rotating striker assembly being adapted to periodically deflect said pair of mutually facing free beam ends a selected distance in opposite substantially horizontal directions prior to their release to produce free beam vibrations in said horizontal plane, said selected deflection distance being determinative of the amplitude of said free beam vibrations;
a granite slip table including a substantially horizontal load bearing surface;
an oil film disposed on said load bearing surface;
said structure being positioned on said oil film to provide substantially frictionless freedom of motion in the plane of said load bearing surface;
a plurality of brackets affixed to said slip table each extending above said load bearing surface opposite said structure; and
spring means disposed between each of said brackets and said structure in a manner adapted to filter out horizontal vibrations of said load bearing surface, the natural frequency of said spring means being no greater than one half of the lowest one of said discrete resonant frequencies;
whereby the vibrations of each of said cantilever beams are transmitted through said structure to impart complex vibration in a horizontal direction to said test surface; the constituent components of said complex vibration consisting substantially of said discrete frequencies of vibration.

23. Apparatus for vibration testing a work piece adapted to be positioned on a test surface comprising:
a substantially rigid support structure including said test surface;

a plurality of resonator assemblies mounted on said structure each having a discrete resonant frequency, each of said resonator assemblies comprising an elongated beam fixed at least at one end thereof; and means mounted on said structure for setting said beams into free vibration so as to produce concurrent vibrations of the corresponding resonator assemblies at their respective discrete resonant frequencies;

whereby complex vibration is imparted to said test surface through said support structure, said complex vibration having substantially said discrete resonant frequencies as its constituent components.

* * * * *